(No Model.)
D. T. GRAY.
PROCESS OF AND APPARATUS FOR PURIFYING WAX, FATS, OR RESINS.
No. 248,735. Patented Oct. 25, 1881.
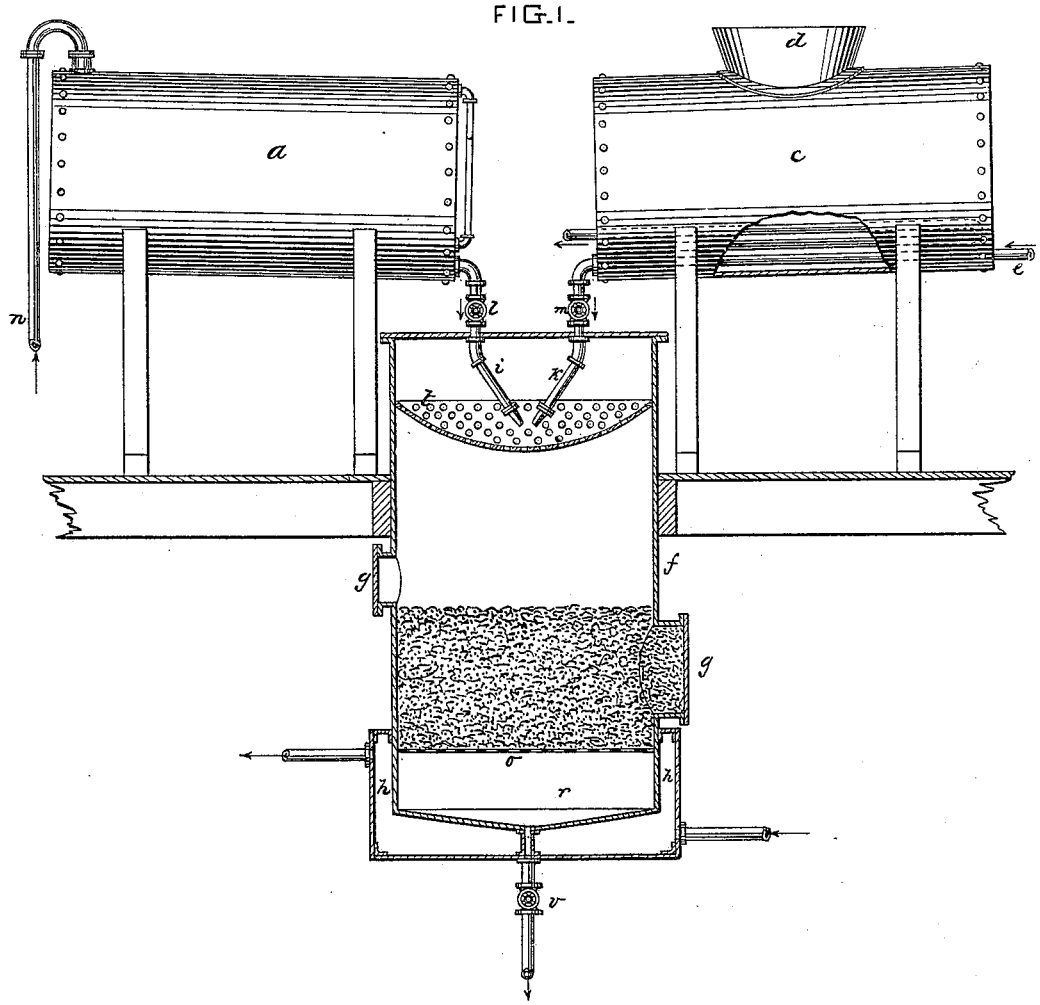
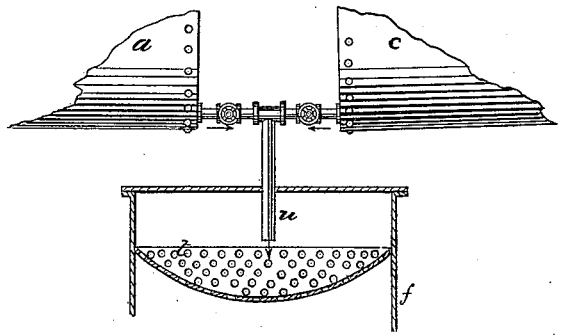
WITNESSES:
Chas. M. Higgins.
Jacob F. Levy
INVENTOR:
Daniel T. Gray
By Munn
Attorneys

UNITED STATES PATENT OFFICE.

DANIEL T. GRAY, OF BROOKLYN, ASSIGNOR, BY MESNE ASSIGNMENTS, TO JOHN A. STOUTENBURGH, OF NEW YORK, N. Y.

PROCESS OF AND APPARATUS FOR PURIFYING WAX, FATS, OR RESINS.

SPECIFICATION forming part of Letters Patent No. 248,735, dated October 25, 1851.

Application filed January 24, 1881. (No model.)

*To all whom it may concern:*

Be it known that I, DANIEL T. GRAY, of Brooklyn, in the county of Kings and State of New York, have invented certain new and useful Improvements in Process of and Apparatus for Purifying Wax, Fats, or Resins, of which the following is a specification.

My invention is adapted for the purification of any solid, semi-solid, or thick waxy, fatty, or resinous substance; but is more especially designed for the purification of crude paraffine wax, and will be described with particular reference thereto, it being understood that the same system may be used for the other substances named.

The crude paraffine-wax, which is obtained by freezing and pressure from paraffine-oil in the well-known manner, contains tarry and coloring matters, which require to be removed to render the wax pure, white, and inodorous. To effect this it is usual to dissolve the wax in naphtha or similar solvent and then filter the solution through bone-black, which removes the tar and coloring matters and renders the solution pure. This filtered solution is then frozen or chilled and pressed to express the fluid matter and compress or solidify the wax. The wax is next placed in a still and the remaining portion of volatile matter distilled off, after which the now fully purified and molten wax is run off and into suitable molds, cooled, and finally formed into suitable packages for sale. The expressed fluid is also distilled to separate the naphtha from the paraffine-oils, both of which are thus utilized. Now I employ this same system; but in my process the operations of mixing the wax and solvent and filtering the solution are performed in a novel manner—that is, heretofore a given quantity of the wax has been dissolved in a given quantity of the naphtha in the same vessel by heat and agitation, from which the solution is afterward transferred to the filter. I, on the contrary, melt the wax and store the naphtha in separate vessels and cause a stream of each to mingle and the resulting mixture or solution to pass directly through the filter, thus rendering the process quick, simple, and continuous, instead of intermittent, as heretofore, and this forms the main feature of my invention, as hereinafter fully set forth.

Figure 1 of the drawings presents a vertical section of an apparatus by which my system is carried out, and in itself forms part of my invention. Fig. 2 represents a modification of a part of this apparatus.

In Fig. 1, $a$ represents a tank or vessel, which is charged with the naphtha or other solvent for the wax, which is pumped therein through the pipe $n$, or otherwise conveyed thereto.

$c$ indicates a second tank, adjoining but distinct from the former, in which the wax is melted. This tank is formed with a hopper or opening, $d$, through which the crude wax is fed into the tank, and in the bottom of the tank is arranged a heating pipe or coil, $e$, connected with a steam-boiler or other source of heat sufficient to melt the wax and render it quite hot and fluid.

$f$ indicates the filter, which is preferably made in the form of an upright cylinder closed on all sides with a perforated portion, $o$, in which a mass of the bone-black or other filtering material rests, while below the same is a collecting-chamber, $r$, into which the filtered fluid drips, and which has an inclined bottom from which extends an exit-pipe, $v$, controlled by a suitable valve by which the filtered liquid may be drawn off as required or let out as fast as it passes through the filter. The filtering-chamber is provided with suitable man-holes and covers, as shown at $g$, whereby the filtering material may be removed and renewed, as usual, and around the base of the filtering-chamber, as well as the collecting chamber, is a steam-jacket, $h$, whereby the entire filter may be kept heated up to or above the melting-point of the wax, so as to insure the free passage of the fluid through the same. Now, pipes $i, k$ extend, respectively, from the naphtha and wax tanks and project into the top of the filter $f$, where their orifices are turned toward and open opposite each other over the filtering-bed $s$, as shown, each pipe being provided with a suitable regulating-valve, $l\ m$.

It will now be understood that when the apparatus is in action, the filter $f$ being hot, the tank $a$ charged with naphtha, and the charge of wax in the tank $c$ melted, if the valves $l\ m$ are opened the wax and naphtha will flow in streams into the filter, which streams, meeting or impinging on each other, will at once mix intimately together, so that the wax becomes dissolved in and diluted by the naphtha, and this mixture or solution thence falls on the filtering-bed, and, percolating through the same, becomes thereby purified, and finally drops into the collecting-chamber $r$, from which it may be drawn off through the pipe as required. Hence by this system the use of mechanical stirrers to effect the mixture and solution of the wax with the naphtha is obviated, and, moreover, the mixture of the two and the flow of the same through the filter goes on continually and not in intermittent stages as heretofore, and this action may be thus kept up during the entire day, being limited only by the exhaustion of the filtering material, which, however, will ordinarily endure through one day's work. The apparatus necessary to effect the aforesaid mixture and filtration is thus rendered quite simple and compact, the labor required to operate the same reduced, and a better and greater result obtained than by the method heretofore in use.

It will be observed from Fig. 1 that the filter is constructed with a transverse perforated partition, $t$, between the discharge-nozzles from the tank and the filtering-bed $s$. The mixed streams from the nozzle fall first on this partition and pass through the perforations thereof before falling on the filtering material, and this partition thus acts to more thoroughly mix the wax and naphtha before the same reaches the filtering-bed; and, furthermore, as this partition becomes heated from the walls of the filter, it serves to prevent any chilling of the hot wax by contact with the cool naphtha.

I prefer to form this partition concave, in the form of a basin, as illustrated; but it may be level or convex, if desired.

Instead of having the pipes $i$ $k$ extended separately from each tank into the filter, they may be arranged in the form of a T, as shown in Fig. 2, so that the streams rush directly toward and into each other, and thus mix together at their junction, and thence descend through the vertical pipe $u$, where they become more thoroughly mixed before entering the filter.

It may be understood that after the filtered solution of wax and naphtha is drawn from the pipe $v$ it is then chilled and pressed to express the fluid and solidify the wax, each of which is then separately distilled to remove all volatile matter from the wax and save the fluid matters in the usual manner, as before referred to, which operations, however, form no novel part of my system.

I am aware that paraffine-wax has been mixed by mechanical means with naphtha and then passed through filtering material arranged between two perforated plates, the upper one being in contact with the filtering medium. This arrangement, however, left no space below the upper perforated plate, and it was therefore necessary to mix the material thoroughly before passing it through the filter.

Having thus fully described my invention, I claim as new and desire to secure by Letters Patent—

1. The improvement in the process of purifying wax or equivalent material, consisting in causing a stream of wax, while in a fluid or melted state, and a stream of naphtha or other solvent to flow together, and thus form an intimate mixture or solution, and thence pass through a filter, substantially as herein specified.

2. An improved apparatus for purifying wax or similar material, consisting of a vessel for holding the wax in a liquefied or melted state, and a distinct vessel for holding naphtha or other solvent, in combination with a suitable filter and connections from said tanks to said filter, whereby the wax and solvent flow together into said filter, form an intimate mixture or solution, and thence pass directly through the filter, substantially as herein shown and described.

3. In an apparatus for purifying wax or similar material, the combination of the filter $f$, formed with a perforated partition, $t$, arranged above the filtering medium, with a space between the two, with a means, substantially as described, for furnishing a supply of the material to be filtered and the dissolving liquid, and arranged to discharge the same upon and through said perforated partition, whereby the material is thoroughly mixed before reaching the filtering medium, substantially as described.

DANIEL T. GRAY.

Witnesses:
CHAS. M. HIGGINS,
JACOB F. LEVY.